US010326923B2

(12) United States Patent
Miyake

(10) Patent No.: US 10,326,923 B2
(45) Date of Patent: Jun. 18, 2019

(54) MEDICAL IMAGING PROCESSING APPARATUS FOR A VIRTUAL ENDOSCOPE IMAGE

(71) Applicant: CANON KABUSHIKI KAISHA, Tokyo (JP)

(72) Inventor: Noriaki Miyake, Kitakyushu (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 15/380,968

(22) Filed: Dec. 15, 2016

(65) Prior Publication Data

US 2017/0187935 A1 Jun. 29, 2017

(30) Foreign Application Priority Data

Dec. 25, 2015 (JP) .................................. 2015-253812

(51) Int. Cl.
*H04N 5/232* (2006.01)
*G06T 7/00* (2017.01)
*G06T 19/00* (2011.01)
*G06T 7/187* (2017.01)

(52) U.S. Cl.
CPC .......... *H04N 5/232* (2013.01); *G06T 7/0012* (2013.01); *G06T 7/187* (2017.01); *G06T 19/00* (2013.01); *G06T 2207/10081* (2013.01); *G06T 2207/10088* (2013.01); *G06T 2207/30028* (2013.01)

(58) Field of Classification Search
CPC ......... H04N 5/232; G06T 7/187; G06T 19/00; G06T 7/0012; G06T 2207/30028; G06T 2207/10088; G06T 2207/10081
USPC .......................................................... 348/65
See application file for complete search history.

(56) References Cited

U.S. PATENT DOCUMENTS

| 7,508,388 B2* | 3/2009 | Barfuss | A61B 6/466 345/418 |
| 2005/0281481 A1* | 12/2005 | Guendel | A61B 6/466 382/276 |
| 2008/0117210 A1* | 5/2008 | Razeto | G06T 7/0012 345/424 |

(Continued)

FOREIGN PATENT DOCUMENTS

| JP | 2002-538915 A | 11/2002 |
| JP | 2010-284313 A | 12/2010 |

(Continued)

OTHER PUBLICATIONS

Arnold et al, High-Sensitivy Hyper-spectral Video Endoscopy System for Intra-Surgical Tissue Classification (Year: 2010).*

*Primary Examiner* — Shan E Elahi
(74) *Attorney, Agent, or Firm* — Canon U.S.A., Inc. I.P. Division

(57) ABSTRACT

One or more medical image processing apparatuses, methods for same and storage mediums are provided herein. At least one medical image processing apparatus obtains a medical image including a tubular structure picked up by a medical image pickup apparatus and generates a virtual endoscope image of the tubular structure on the basis of the obtained medical image. The obtained medical image accepts a specification of a target portion on the tubular structure, performs control to generate a cross-sectional image of the target portion on a cross section observation line indicating a cross section of the target portion from the medical image and displays the cross-sectional image.

20 Claims, 8 Drawing Sheets

(56) References Cited

U.S. PATENT DOCUMENTS

| | | | | |
|---|---|---|---|---|
| 2010/0013910 A1* | 1/2010 | Farr | ............... | G02B 7/001 |
| | | | | 348/51 |
| 2010/0135543 A1* | 6/2010 | Weese | ............... | G06T 11/001 |
| | | | | 382/128 |
| 2015/0173721 A1* | 6/2015 | Satoh | ............... | A61B 8/0891 |
| | | | | 600/440 |

FOREIGN PATENT DOCUMENTS

| | | |
|---|---|---|
| JP | 2011-172692 A | 9/2011 |
| JP | 2015-226638 A | 12/2015 |

\* cited by examiner

MEDICAL IMAGING PROCESSING APPARATUS FOR A VIRTUAL ENDOSCOPE IMAGE

BACKGROUND

Field

This disclosure relates to a medical image processing apparatus, methods for same, and storage mediums for use therewith.

Description of the Related Art

In recent years, a mortality rate of a large bowel cancer has been increased among mortality causes related to cancers. Medical checkup programs using an endoscope inspection or the like have been developed for early detection and treatment of the large bowel cancer. Among them, a technique has been proposed for diagnosing the inside of an intestinal tract using a virtual endoscope function on the basis of a medical image obtained by imaging the large bowel using a computed tomography (CT) apparatus.

In radiogram interpretation of the above-described virtual endoscope, a degree of risk varies depending on a size of an abnormal portion (polyp), and it is important to grasp the size of the abnormal portion. Japanese Patent Laid-Open No. 2015-226638 describes measurement of the size by specifying two desired points of a target portion. Furthermore, Japanese Patent Laid-Open No. 2015-226638 describes that medical image data between the specified two points is identified, and a profile curve of a CT value is created to be displayed together with an image for the radiogram interpretation.

In this manner, a cross-sectional state of the abnormal portion is also checked at the time of the diagnosis of the abnormal portion. However, according to the method described in Japanese Patent Laid-Open No. 2015-226638, an issue occurs that a corresponding cross-sectional image is not displayed unless the section between the two points is not specified, which becomes troublesome for a radiogram interpreter.

SUMMARY

In view of at least the above, this disclosure provides a system in which a cross-sectional state of a target portion where a specification is accepted may be easily checked.

It should be noted that not only the above-described aspect but also realization of actions and advantages that are derived from respective configurations illustrated in the following embodiment section and are not attained in the related art can be regarded as another aspect or aspects of this disclosure.

A medical image processing apparatus according to an aspect of at least one embodiment of the present disclosure includes an obtaining unit configured to obtain a medical image including a tubular structure picked up by a medical image pickup apparatus, a generation unit configured to generate a virtual endoscope image of the tubular structure on a basis of the medical image obtained by the obtaining unit, a specification acceptance unit configured to accept a specification of a target portion on the tubular structure, a determination unit configured to determine a cross section observation line that indicates a cross section of the target portion accepted by the specification acceptance unit and that is displayed on the virtual endoscope image on a basis of a size of the target portion, and a display control unit configured to perform control to generate a cross-sectional image of the target portion on the cross section observation line determined by the determination unit from the medical image and display the cross-sectional image.

According to other aspects of the present disclosure, one or more additional medical image processing apparatuses, one or more methods for same and one or more storage mediums are discussed herein. Further features of the present disclosure will become apparent from the following description of exemplary embodiments with reference to the attached drawings.

DESCRIPTION OF THE EMBODIMENTS

Hereinafter, exemplary embodiments will be described with reference to the accompanying drawings. It should be noted that the exemplary embodiments described below illustrate an example or examples in a case where the present disclosure is specifically implemented, and each exemplary embodiment is one specific example of at least one configuration having one or more features that may be described or recited in the following section of claims. However, while embodiments are discussed as examples of one or more features, it is to be understood that the invention is not limited to the disclosed exemplary embodiments.

According to at least one present exemplary embodiment, descriptions will be given of an example of an image processing apparatus configured to set a viewpoint with respect to a model of an inner wall of a tubular structure based on volume data generated from an X-ray CT image (medical image) obtained by an X-ray computed tomography (CT) apparatus (medical image diagnosis apparatus) and generate a two-dimensional image of the model viewed from the viewpoint by projection while the viewpoint is set as a projection center. It should be noted that the at least one exemplary embodiment is not limited to the X-ray CT image, and an image imaged by another modality apparatus such as a magnetic resonance imaging (MRI) apparatus may be used, preferably, in one or more embodiments, so that a condition of an organ may be displayed.

Figure 1:
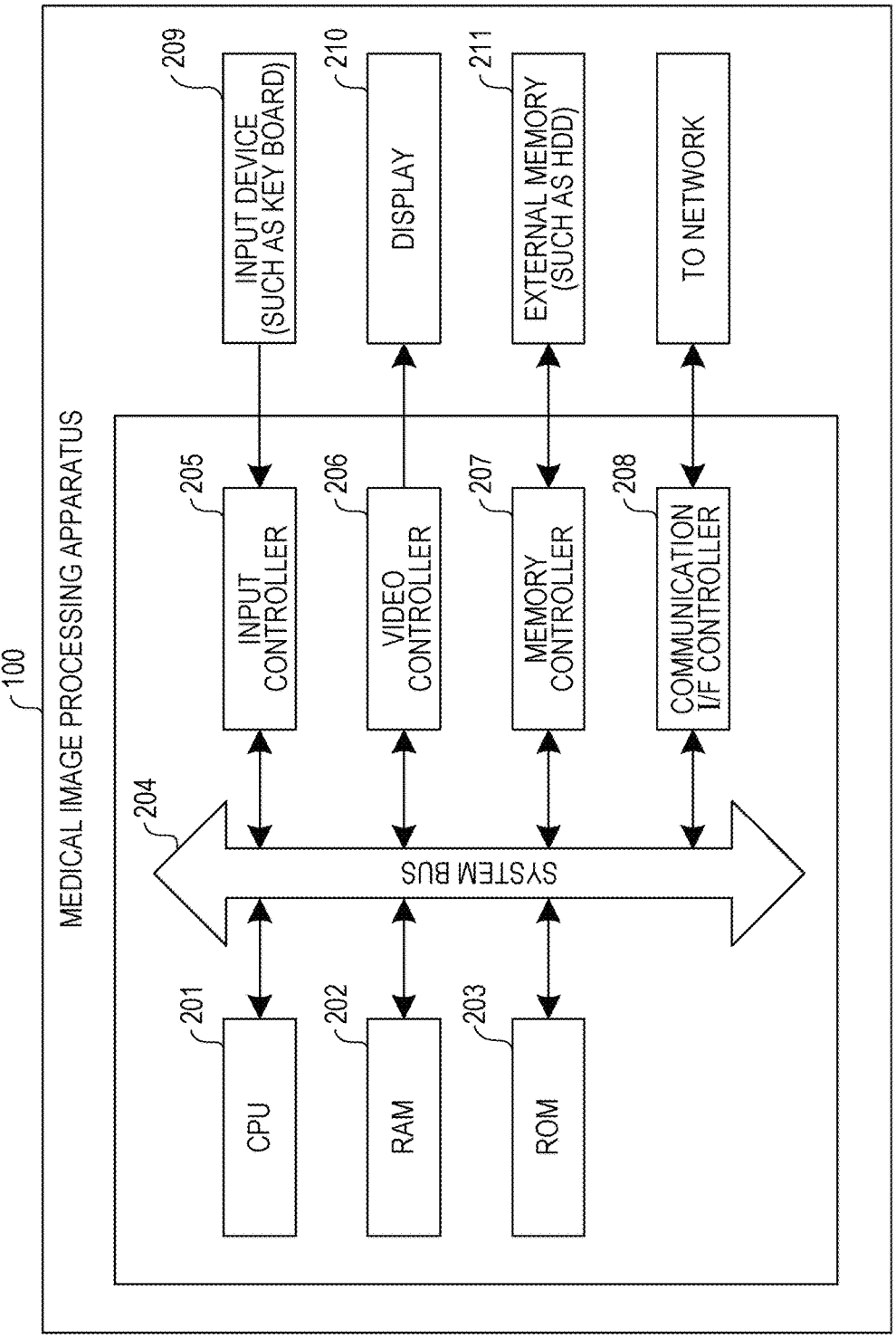
FIG. 1 is an explanatory diagram for describing an example of a hardware configuration of a medical image processing apparatus according to the present exemplary embodiment.

First, a hardware configuration example of a medical image processing apparatus 100 according to the present exemplary embodiment will be described with reference to a block diagram of FIG. 1.

A CPU 201 executes processing by using a computer program or data stored in a RAM 202 or a ROM 203 to perform an operation control of the entirety of the medical image processing apparatus 100 and also executes or controls respective processings to be performed by the medical image processing apparatus 100 as described below.

The RAM 202 includes an area for storing the medical image processing apparatus 100 loaded from an external memory 211, data received from the outside via a communication I/F controller 208, or the like. Furthermore, the RAM 202 includes a work area used when the CPU 201 executes the various processings. In this manner, the RAM 202 can appropriately provide various areas.

The ROM 203 stores non-rewritable setting data of the medical image processing apparatus 100, a non-rewritable computer program of the medical image processing apparatus 100, or the like.

An input controller 205 is configured to notify the CPU 201 of an input from an input device 209. The input device 209 is constituted by a user interface such as a key board or a mouse and can input various instructions to the CPU 201 while a user operates the input device 209.

A video controller 206 is configured to perform display control of a display 210. The display 210 is an example of a display device and can display a processing result by the CPU 201 in the form of an image, a character, or the like. It should be noted that the input device 209 and the display 210 may be integrated to each other to constitute a touch panel screen.

A memory controller 207 is configured to control read and write of the computer program or data with respect to the external memory 211. The external memory 211 is a large capacity information storage device such as a hard disc drive (HDD). The external memory 211 saves an operating system (OS) or the computer program or data for causing the CPU 201 to execute or control the respective processings performed by the medical image processing apparatus 100 as described below.

This data includes, in at least one embodiment for example, one described as related-art information in the following explanation. The computer program or data saved in the external memory 211 is appropriately loaded onto the RAM 202 in accordance with the control by the CPU 201 and becomes a processing target by the CPU 201.

The communication I/F controller 208 is configured to control a data communication with an external device.

The CPU 201, the RAM 202, the ROM 203, the input controller 205, the video controller 206, the memory controller 207, and the communication I/F controller 208 are all connected to a system bus 204.

Next, an operation (function) of at least one embodiment of the medical image processing apparatus 100 will be described. In general, it is possible to generate volume data of a subject from a plurality of X-ray CT images of a whole body or part of the subject (patient) picked up by the X-ray computed tomography (CT) apparatus. This volume data is constituted by a group of voxels, and corresponding CT values (signal values) are associated with the respective voxels as in a related art. According to the present exemplary embodiment, when a specification of a target portion is accepted in a state in which a two-dimensional image (virtual endoscope image) is generated while the model of the inner wall of the tubular structure (inner wall model) based on the above-described volume data is viewed from a specified viewpoint and displayed, a cross section observation line such as, for example, a long diameter line of the target portion is automatically determined, and the cross-sectional image on the cross section observation line is displayed.

Figure 2:
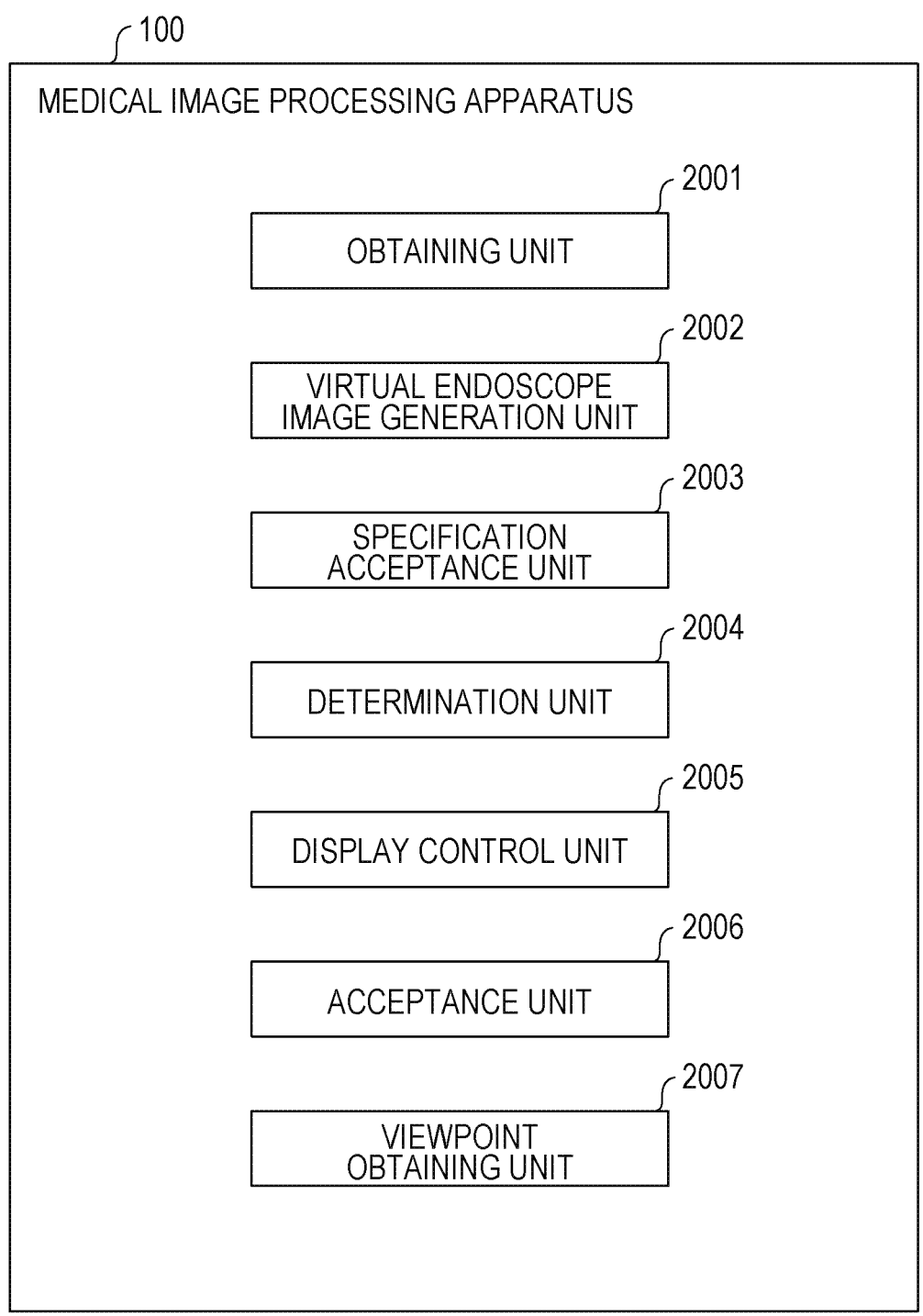
FIG. 2 is an explanatory diagram for describing an example of a function configuration of the medical image processing apparatus according to the present exemplary embodiment.

A function configuration of at least one embodiment of the medical image processing apparatus 100 will be described with reference to FIG. 2. The medical image processing apparatus 100 is provided with an obtaining unit 2001, a generation unit 2002, a specification acceptance unit 2003, a determination unit 2004, a display control unit 2005, an acceptance unit 2006, and a viewpoint obtaining unit 2007. The obtaining unit 2001 obtains a medical image including a tubular structure picked up by a medical image pickup apparatus. The generation unit 2002 generates a virtual endoscope image of the tubular structure on the basis of the obtained medical image. The specification acceptance unit 2003 accepts a specification of the target portion on the tubular structure.

The determination unit 2004 determines the cross section observation line indicating the position of the cross section of the specified target portion. The display control unit 2005 performs control to generate a cross-sectional image of the target portion on the cross section observation line from the obtained medical image and display the cross-sectional image. The acceptance unit 2006 accepts an operation of moving the cross section observation line in a direction intersecting with an extending direction of the cross section observation line. The viewpoint obtaining unit 2007 obtains a viewpoint position of the displayed virtual endoscope image.

Figure 3:
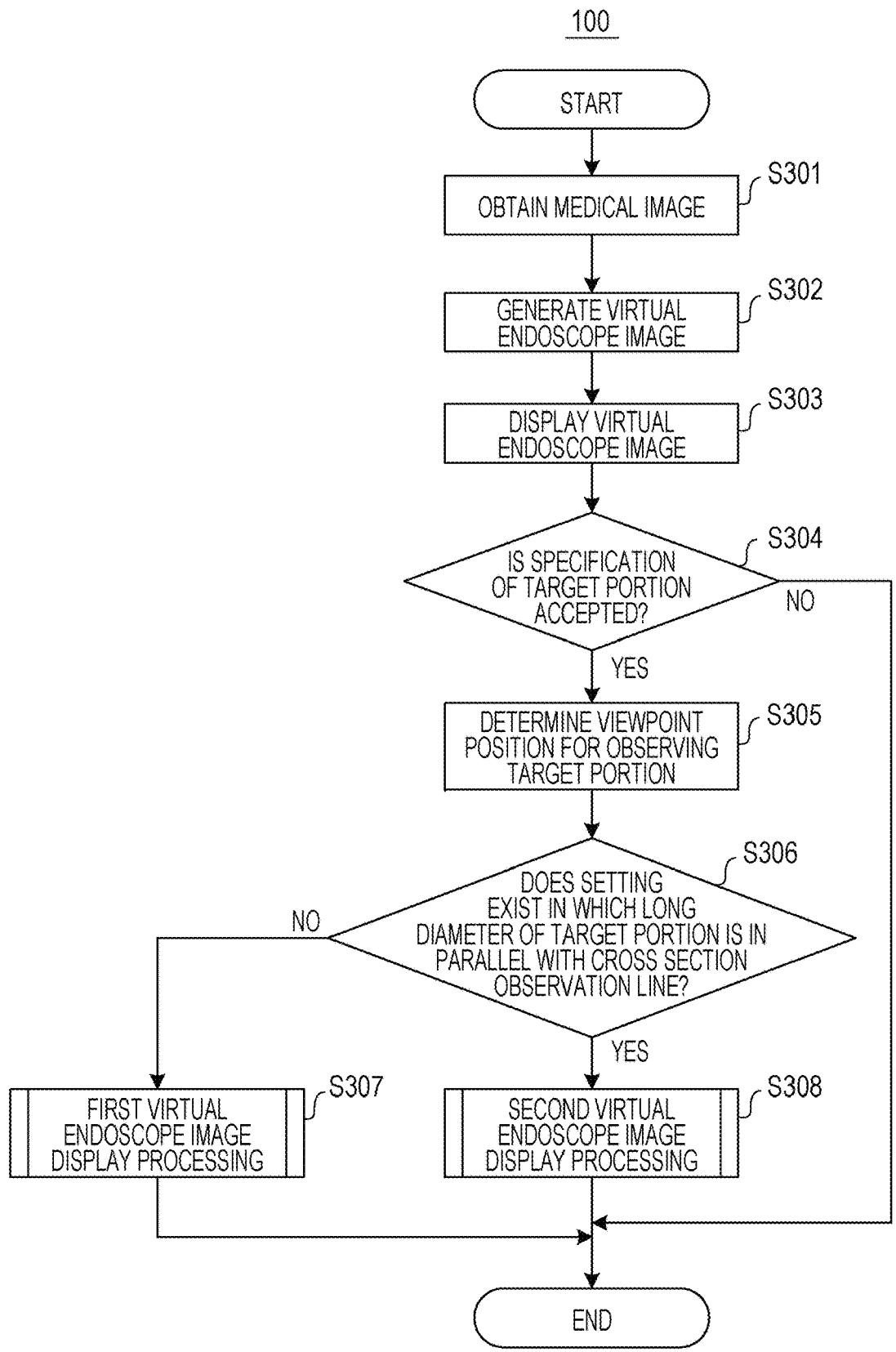
FIG. 3 is a flow chart for describing an example of detailed processing according to the present exemplary embodiment.

Two-dimension image generation processing for the inner wall model of the tubular structure by the medical image processing apparatus 100 will be described with reference to a flow chart of FIG. 3. In the flow chart of FIG. 3, a case where the tubular structure is an intestinal tract is described, but the flow chart of FIG. 3 can be similarly used even when the tubular structure is, for example, a stomach or a bronchial tube other than the intestinal tract.

Hereinafter, the processing according to the present exemplary embodiment will be described in detail with reference to the flow chart of FIG. 3.

In step S301, the CPU 201 of the medical image processing apparatus 100 obtains the volume data (medical image) in the external memory 211 or the RAM 202 (which is equivalent to an obtaining unit). An obtaining source of the volume data is not limited to a particular obtaining source. For example, the CPU 201 obtains the volume data from an external server device or storage device.

In step S302, the CPU 201 of the medical image processing apparatus 100 generates a virtual endoscope image corresponding to a two-dimensional image of the inner wall model of the tubular structure (large bowel) viewed from a position of a viewpoint previously specified by the user by using a previously stored parameter by performing volume rendering, for example. Since a technology for generating an image of a virtual object viewed from a certain viewpoint is a related-art technology or related-art information, description related to this technology or information will be omitted. It should be noted that, with regard to a color of the inner wall model, for example, a color regulated by the above-described parameter with respect to the CT value of the voxel corresponding to the inner wall of the large bowel is allocated.

Figure 6:
FIG. 6 illustrates an example of a virtual endoscope image displayed in step S303.

In step S303, the CPU 201 of the medical image processing apparatus 100 displays the virtual endoscope image generated in step S302 on the display 210. For example, a virtual endoscope image 600 illustrated in FIG. 6 is displayed. A target portion 601 like a polyp raised on the inner wall of the large bowel can be observed from the virtual endoscope image illustrated in FIG. 6.

In step S304, the CPU 201 of the medical image processing apparatus 100 determines whether or not a specification of the target portion on the virtual endoscope image 600 displayed in step S303 is accepted (which is equivalent to a specification acceptance unit). When it is determined that the specification of the target portion is accepted on the virtual endoscope image 600, the processing proceeds to step S305. When it is determined that the specification is not accepted, the processing is ended. With regard to a determination method on whether or not the specification of the target portion is accepted, for example, it may be determined that the specification is accepted as coordinates of the target portion by using coordinates corresponding to a position of a cursor on the virtual endoscope image in a case where a double click operation or the like by the mouse functioning as the input device 209 is accepted on the virtual endoscope image. This determination method is an example, and other methods may be used as long as a specification of a coordinate system of the target portion can be accepted.

In step S305, the CPU 201 of the medical image processing apparatus 100 determines the viewpoint position for observing the target portion (specified target portion) where the specification is accepted in step S304 (which is equivalent to a viewpoint position obtaining unit). This viewpoint position is, for example in at least one embodiment, specifically a point on a core line of the large bowel, and a position on the core line where a distance between the coordinates of the target portion where the specification is accepted in step S304 and the core line becomes the shortest is determined as the viewpoint position.

In step S306, the CPU 201 of the medical image processing apparatus 100 determines whether or not a setting is made in which the cross section observation line can be moved while the long diameter of the target portion is set as a center. With regard to this determination, for example, it is possible to determine whether or not a state is established in which a check box on a graphical user interface (GUI) displayed on the display 210 is previously selected by the user. When it is determined that the cross section observation line can be moved while the long diameter of the target portion is set as a center, the processing proceeds to step S308. When it is determined that the setting is not made, the processing proceeds to step S307.

In step S307, the CPU 201 of the medical image processing apparatus 100 performs first virtual endoscope image display processing in which a direction of the long diameter of the selected target portion is not taken into account.

Detailed descriptions of at least one embodiment of the first virtual endoscope image display processing will be given with reference to a flow chart of FIG. 4.

In step S308, the CPU 201 of the medical image processing apparatus 100 performs second virtual endoscope image display processing along the long diameter of the selected target portion. A detailed processing flow of at least one embodiment of the second virtual endoscope image display processing will be described in detail with reference to a flow chart of FIG. 5.

Figure 4:
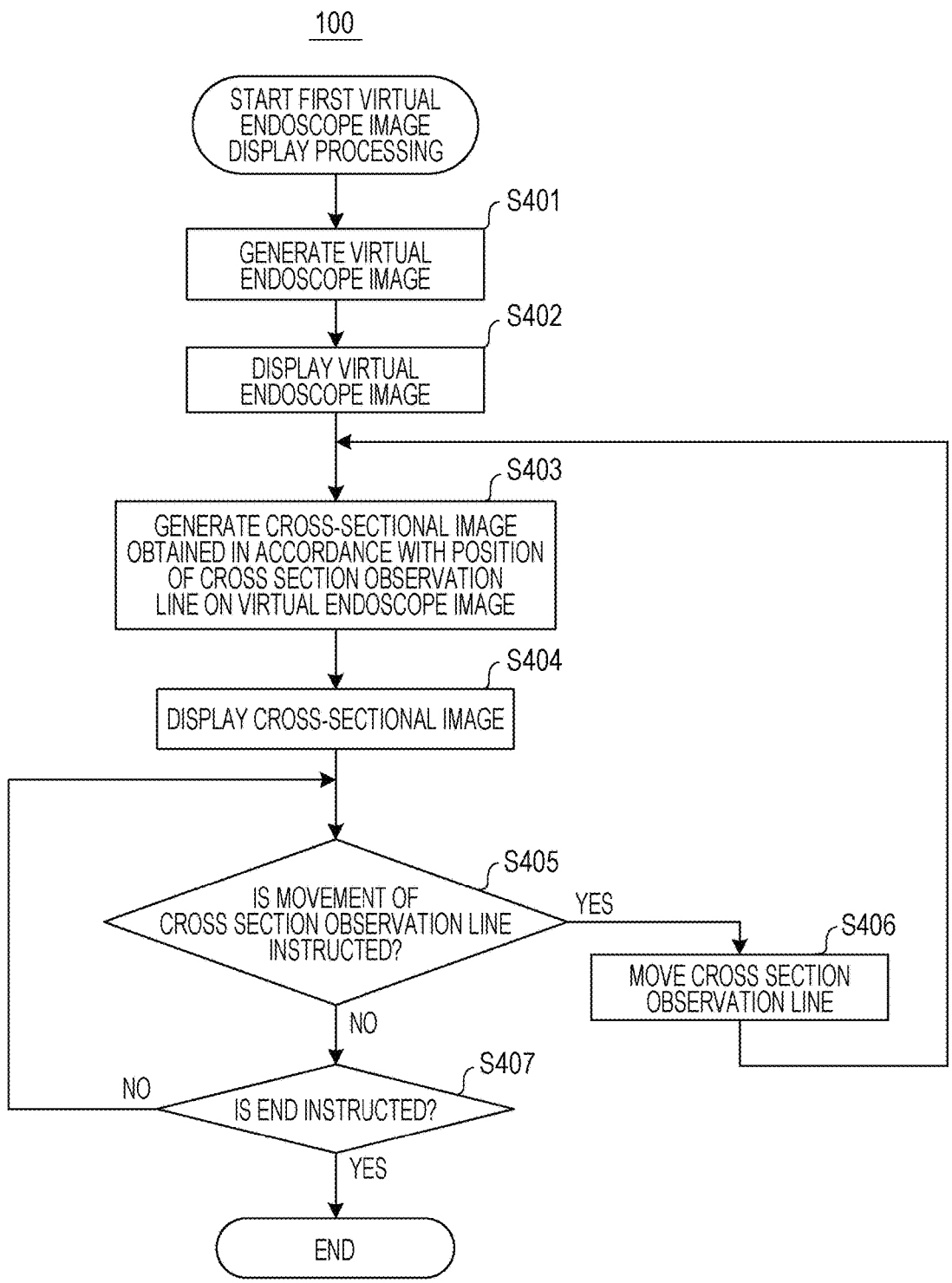
FIG. 4 is a flow chart for describing an example of detailed processing of first virtual endoscope image display processing illustrated in FIG. 3.

The descriptions of the flow chart of FIG. 4 will be started.

Figure 7A:
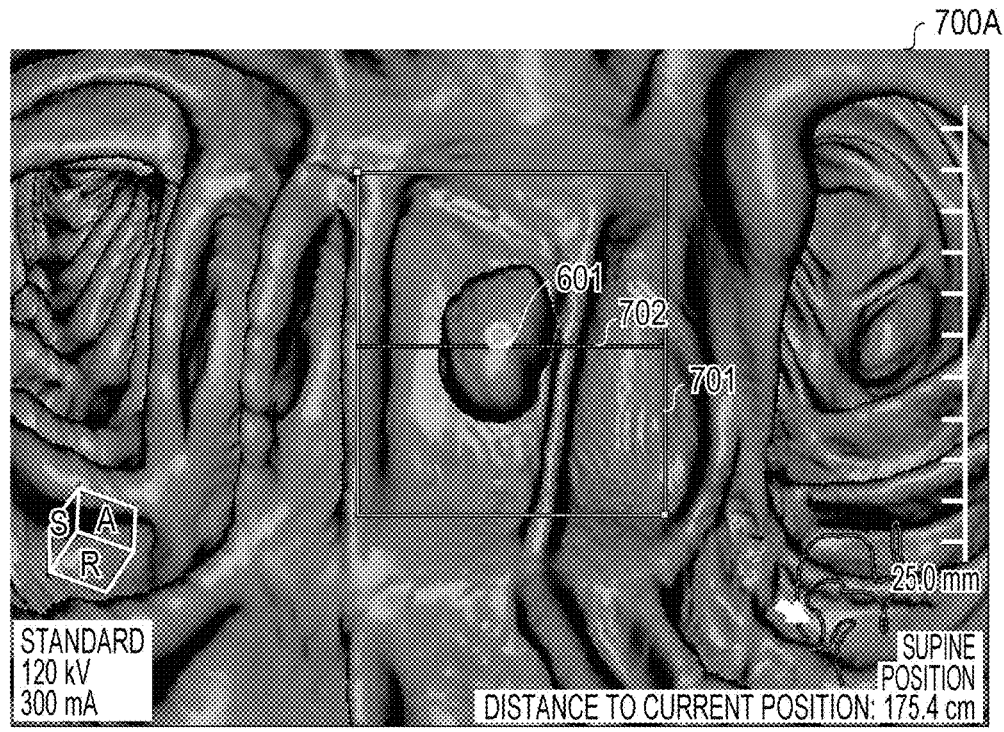
FIGS. 7A and 7B illustrate an example of the virtual endoscope image displayed in the first virtual endoscope image display processing.
Figure 7B:
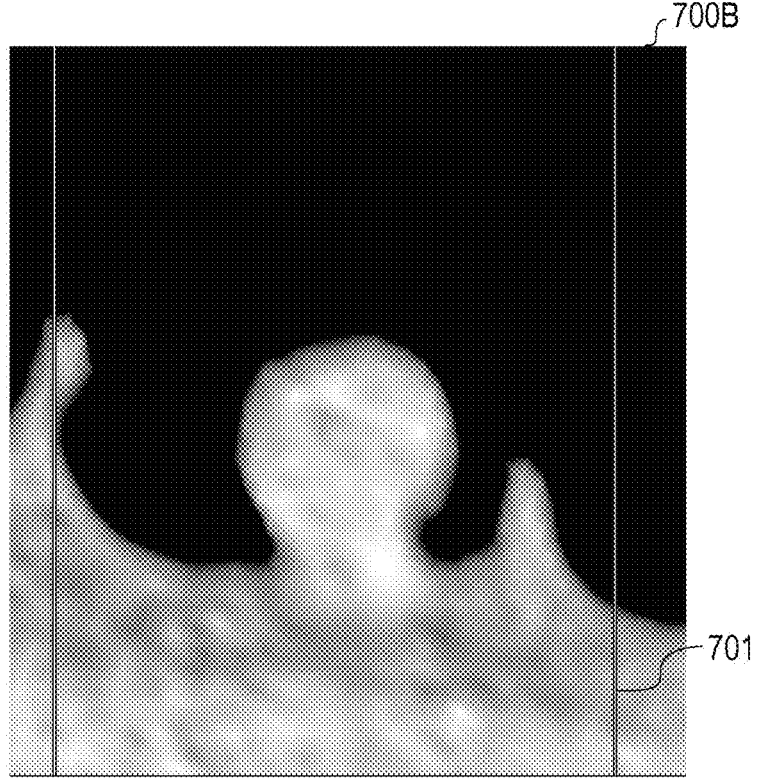

In step S401, the CPU 201 of the medical image processing apparatus 100 generates a virtual endoscope image 700A while the viewpoint position determined in step S305 is set as a viewpoint (the CPU 201 is equivalent to a generation unit). As illustrated in FIGS. 7A and 7B, the virtual endoscope image 700A is the virtual endoscope image obtained by viewing the target portion 601 selected in step S304 from the viewpoint position determined in step S305 and is displayed in a manner that an extending direction of the core line of the large bowel becomes the left-and-right direction of the virtual endoscope image. That is, in step S401, the virtual endoscope image in a direction along the core line of the large bowel is generated irrespective of the long diameter of the selected target portion 601.

A cross section observation line 702 and a cross section generation range 701 corresponding to a range where the cross section observation line 702 can be moved are displayed at the position of the selected target portion 601 on the virtual endoscope image 700A. Specifically, in at least one embodiment, the cross section observation line 702 is set as a line in parallel with the left-and-right direction of the virtual endoscope image, and the cross section generation range 701 is a rectangular region indicating a range where parallel movement of the cross section observation line 702 can be performed.

In step S402, the CPU 201 of the medical image processing apparatus 100 displays the virtual endoscope image 700A generated in step S401 on the display 210. An example displayed on the display 210 is the virtual endoscope image 700A of FIG. 7A.

In step S403, the CPU 201 of the medical image processing apparatus 100 generates a cross-sectional image 700B obtained in accordance with a position of the cross section observation line 702 in the cross section generation range 701 on the virtual endoscope image 700A. The cross-sectional image 700B is a multi planar reconstruction (MPR) cross-sectional image including the target portion 601 selected in step S304. Specifically, the cross-sectional image 700B is the MPR cross-sectional image cut along the cross section observation line 702 in a direction towards the coordinates where the specification is accepted in step S304 from the viewpoint position determined in step S305. For reference's sake, in a case where the cross section observation line 702 is located at a position overlapped with the coordinates specified in step S304, a plane including the coordinates specified in step S304, the viewpoint position determined in step S305, and the cross section observation line 702 becomes the cross section of the MPR cross-sectional image.

In step S404, the CPU 201 of the medical image processing apparatus 100 displays the MPR cross-sectional image generated in step S403 on the display 210 (which is equivalent to a display control unit). For example, the MPR cross-sectional image is the cross-sectional image 700B illustrated in FIG. 7B. The MPR cross-sectional image corresponding to the cross section generation range 701 of the virtual endoscope image 700A is displayed in the cross-sectional image 700B. While observing this cross-sectional image 700B, the user can measure a shape of the cross section of the target portion 601 (polyp) selected on the virtual endoscope image and a size of the target portion 601.

In step S405, the CPU 201 of the medical image processing apparatus 100 determines whether or not a movement instruction of the cross section observation line 702 is accepted from the user (which is equivalent to an acceptance unit). When it is determined that the movement instruction of the cross section observation line 702 is accepted, the processing proceeds to step S406. When it is determined that the movement instruction is not accepted, the processing proceeds to step S407. Specifically, it is determined whether or not the movement instruction of the cross section observation line 702 is accepted by an operation of a wheel of the mouse functioning as the input device 209.

In step S406, the CPU 201 of the medical image processing apparatus 100 moves the cross section observation line 702 up and down in parallel within a frame of the cross section generation range 701, for example, in accordance with the mouse wheel operation by the user (which is equivalent to a determination unit). After the cross section observation line 702 is moved, the processing returns to step S403. As a result, the cross-sectional image corresponding to the cross section observation line 702 can be displayed while being shifted in conjunction with the up-and-down parallel movement of the cross section observation line 702.

In step S407, the CPU 201 of the medical image processing apparatus 100 determines whether or not an end instruction is accepted from the user. In a case where the end instruction is accepted, the processing is ended. When it is determined that the end instruction is not accepted, the processing returns to step S405.

As described above, in the first virtual endoscope image display processing, the cross-sectional image on the cross section observation line 702 corresponding to a line parallel with a left-and-right direction of the virtual endoscope image is displayed, and also the cross section observation line 702 is moved in an up-and-down direction of the virtual endoscope image, so that the cross-sectional image is also switched in conjunction with the movement to be displayed. For this reason, the user can easily check the cross-sectional state on the predetermined cross section observation line 702 by specifying the target portion. Furthermore, the user can switch and display the cross-sectional image by only moving the cross section observation line 702 up and down while the predetermined coordinates of the target portion are set as the center, so that it is possible to easily check the cross-sectional state of the entirety of the target portion.

With that, the descriptions of the flow chart illustrated in FIG. 4 are ended.

Next, at least one embodiment of the second virtual endoscope image display processing will be described with reference to the flow chart of FIG. 5.

In step S501, the CPU 201 of the medical image processing apparatus 100 performs region segmentation processing on the target portion where the specification is accepted in step S304. A region having an approximate CT value is expanded on the basis of the CT value at the coordinates specified in step S304 by using, for example, a region growing method, and the region is expanded until a predetermined shape (for example, spherical or elliptic) is obtained to perform the segmentation processing on the target portion.

Methods other than the above-described method may be used as long as the segmentation of the region of the target portion 601 can be performed on the basis of the CT value at the coordinates specified in step S304.

In step S502, the CPU 201 of the medical image processing apparatus 100 identifies a long diameter of the segmented region of the target portion in step S501 when viewed from the viewpoint determined in step S305 and also identifies a direction of the long diameter.

Figure 8A:
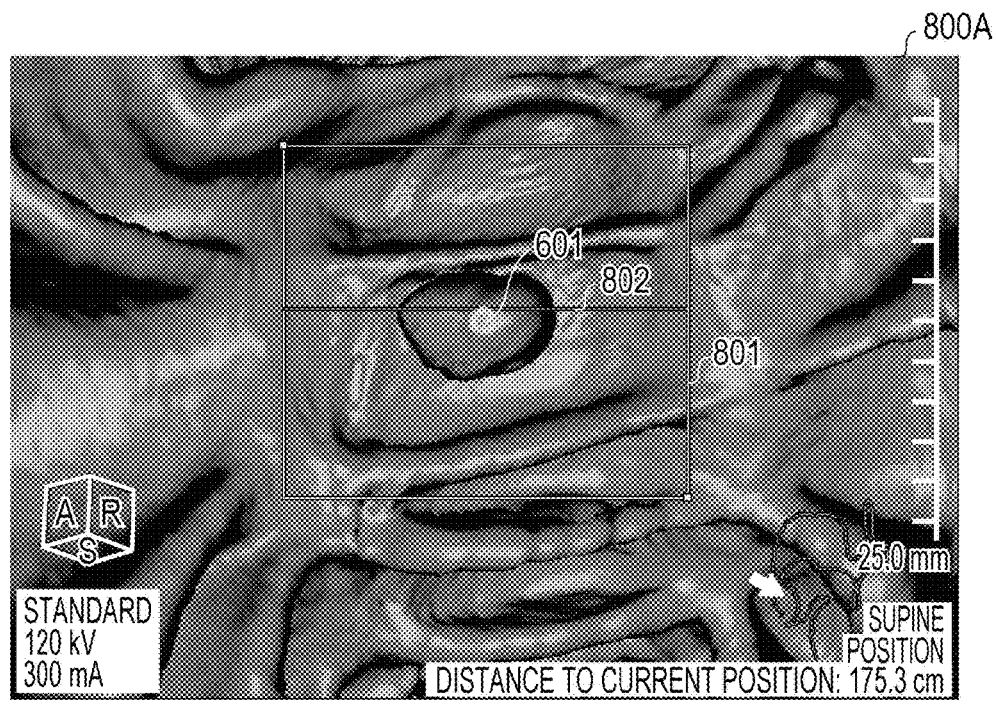
FIGS. 8A and 8B illustrate an example of a virtual endoscope image displayed in the second virtual endoscope image display processing.
Figure 8B:
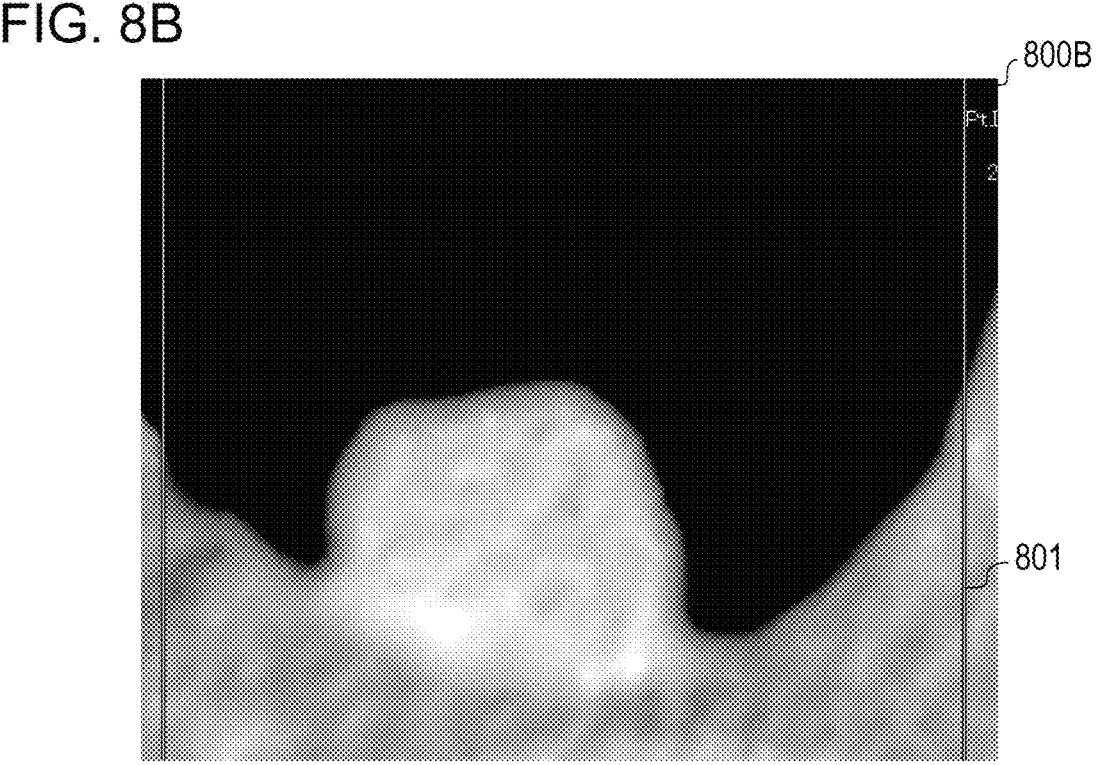

In step S503, the CPU 201 of the medical image processing apparatus 100 generates the virtual endoscope image in which the viewpoint position determined in step S305 is set as the viewpoint (the CPU 201 is equivalent to a generation unit). As illustrated in FIGS. 8A and 8B, the virtual endoscope image 800 is the virtual endoscope image obtained by viewing the target portion 601 selected in step S304 from the viewpoint position determined in step S305 and is displayed in a manner that the long diameter direction identified in step S502 becomes the left-and-right direction of the virtual endoscope. Furthermore, the initial cross section observation line 802 is set at a position matched with the position of the long diameter of the selected target portion 601 in a virtual endoscope image 800A, and the cross section generation range 801 corresponding to the range where the parallel movement of the cross section observation line 802 can be performed is displayed.

The cross section observation line 802 is a line in parallel with the left-and-right direction of the virtual endoscope image, and the cross section generation range 801 is a rectangular region indicating a range where the cross section observation line 802 can be moved.

It should be noted that the position (long diameter line) equivalent to the long diameter of the target portion does not necessarily need to be set as an initial position of the cross section observation line 802, and the position may be anywhere within the cross section generation range as long as the long diameter of the target portion 601 and the cross section observation line 802 are in parallel with each other.

In step S504, the CPU 201 of the medical image processing apparatus 100 displays the virtual endoscope image 800A generated in step S503 as illustrated in FIG. 8A on the display 210.

In step S505, the CPU 201 of the medical image processing apparatus 100 generates a cross-sectional image 800B obtained in accordance with the position of the cross section observation line 802 on the virtual endoscope image 800A. The cross-sectional image 800B is the MPR cross-sectional image including the target portion 601 selected in step S304. Specifically, the cross-sectional image 800B is the MPR cross-sectional image obtained by cutting the cross section observation line 802 matched with the long diameter line along a direction from the viewpoint position determined in step S305 towards the coordinates where the specification is accepted in step S304.

In the above-described manner, the long diameter line on the virtual endoscope image is identified, and the cross-sectional image on the cross section observation line matched with the long diameter line 802 can be displayed, so that the user does not specify the cross section observation line 802 so as to be matched with the long diameter line each time, and it is possible to obtain the cross-sectional image 800B having the long diameter of the target portion 601 desired to be observed.

In step S506, the CPU 201 of the medical image processing apparatus 100 displays the cross-sectional image 800B generated in step S505 on the display 210 (which is equivalent to a display control unit). The displayed example is the cross-sectional image 800B illustrated in FIG. 8B. The MPR cross-sectional image corresponding to a cross section generation range 801 of the virtual endoscope image 800A is displayed in the cross-sectional image 800B. The user can measure the shape of the cross section of the selected target portion 601 on the virtual endoscope image and the size of the target portion 601 by observing the cross-sectional image 800B.

The at least one embodiment of the second virtual endoscope image display processing is different from the at least one embodiment of the first virtual endoscope image display processing in that the cross section observation line 802 is automatically provided so as to be in parallel with the direction of the long diameter of the target portion 601, and the cross section observation line 802 is provided at the position equivalent to the long diameter.

As a result, an advantage is attained that the labor of the user can be alleviated with regard to the setting of the position or orientation of the cross section observation line 802.

In step S507, the CPU 201 of the medical image processing apparatus 100 determines whether or not a movement instruction of the cross section observation line 802 on the virtual endoscope image 800A is accepted (which is equivalent to an acceptance unit). When it is determined that the movement instruction of the cross section observation line 802 is accepted, the processing proceeds to step S508. When it is determined that the movement instruction is not accepted, the processing proceeds to step S509. When it is determined that the movement instruction of the cross section observation line 802 is accepted, the processing proceeds to step S508. When it is determined that the movement instruction is not accepted, the processing proceeds to step S509.

In step S508, the CPU 201 of the medical image processing apparatus 100 performs parallel movement of the cross section observation line 802 in the up-and-down direction of the cross section observation line 802 within a frame of the cross section generation range 801, for example, in accordance with the mouse wheel operation by the user (which is equivalent to a determination unit). After the cross section observation line 802 is moved, the processing returns to step S505.

As a result, the parallel movement of the cross section observation line 802 in the up-and-down direction is performed, and the cross-sectional image corresponding to the cross section observation line 802 can be generated and displayed.

In step S509, the CPU 201 of the medical image processing apparatus 100 determines whether or not an end instruction is accepted from the user. In a case where the end instruction is accepted, the processing is ended. When it is determined that the end instruction is not accepted, the processing returns to step S507.

As described above, in the at least one embodiment of the second virtual endoscope image display processing, the long diameter of the target portion is identified. The display is performed such that the extending direction of the long diameter becomes the left-and-right direction of the virtual endoscope image, and also the cross-sectional image is displayed while the long diameter is set as the position of the initial cross section observation line 802. When the cross section observation line 802 is moved in an up-and-down direction of the virtual endoscope image, the cross-sectional image is also switched in conjunction with the movement to be displayed. For this reason, the user can easily check the cross-sectional state on the cross section observation line 802 of the long diameter by specifying the target portion. Furthermore, the user can switch and display the cross-sectional image by moving the cross section observation line 802 up and down while the long diameter of the target portion is set as the center, so that it is possible to easily check the cross-sectional state of the entirety of the target portion.

The size of the abnormal portion like the polyp is an important factor for determining a characteristic of the abnormal portion. For example, in a case where the long diameter of the abnormal portion is 10 mm or longer, it is determined that the abnormal portion is highly likely a progressive large bowel cancer, and when the long diameter can be measured, the user can estimate that the large bowel cancer is progressive. In the at least one embodiment of the first virtual endoscope image display processing, since the cross-sectional image is a cross section in parallel with the extending direction of the core line of the large bowel, the long diameter of the polyp is not directly found. Thus, in a case where the long diameter of the polyp is measured, an adjustment or the like for rotating the cross section observation line 702 and the cross section generation range 701 is to be performed. In contrast, in the at least one embodiment of the second virtual endoscope image display processing, the cross-sectional image 800B having the long diameter can be obtained from the beginning without performing the above-described adjustment, and it is possible to easily grasp a degree of risk or the cross-sectional state of the abnormal portion.

It should be noted that, according to the present exemplary embodiment, the example has been described in which the extending direction of the long diameter is set to be the left-and-right direction of the virtual endoscope image, and also the cross section observation line 802 can be moved in the up-and-down direction of the virtual endoscope image, so that the cross-sectional state can be checked in a direction intersecting with the extending direction of the long diameter. However, the following configuration may also be adopted. In a state in which the extending direction of the core line of the large bowel is set as the left-and-right direction of the virtual endoscope while a display orientation of the virtual endoscope image is similar to FIG. 7A, a setting is made in a manner that the cross section observation line 802 becomes in parallel with the extending direction of the long diameter of the target portion 601 and can be moved in the direction intersecting with the extending direction of the long diameter, so that the cross-sectional image can be checked.

It should be noted that the example has been described herein in which the extending direction of the long diameter of the target portion 601 is in parallel with the direction of the cross section observation line, but the cross section observation line may be set in an extending direction of a short diameter of the target portion 601 when necessary, so that the cross-sectional state of the short diameter can be checked.

Figure 5:
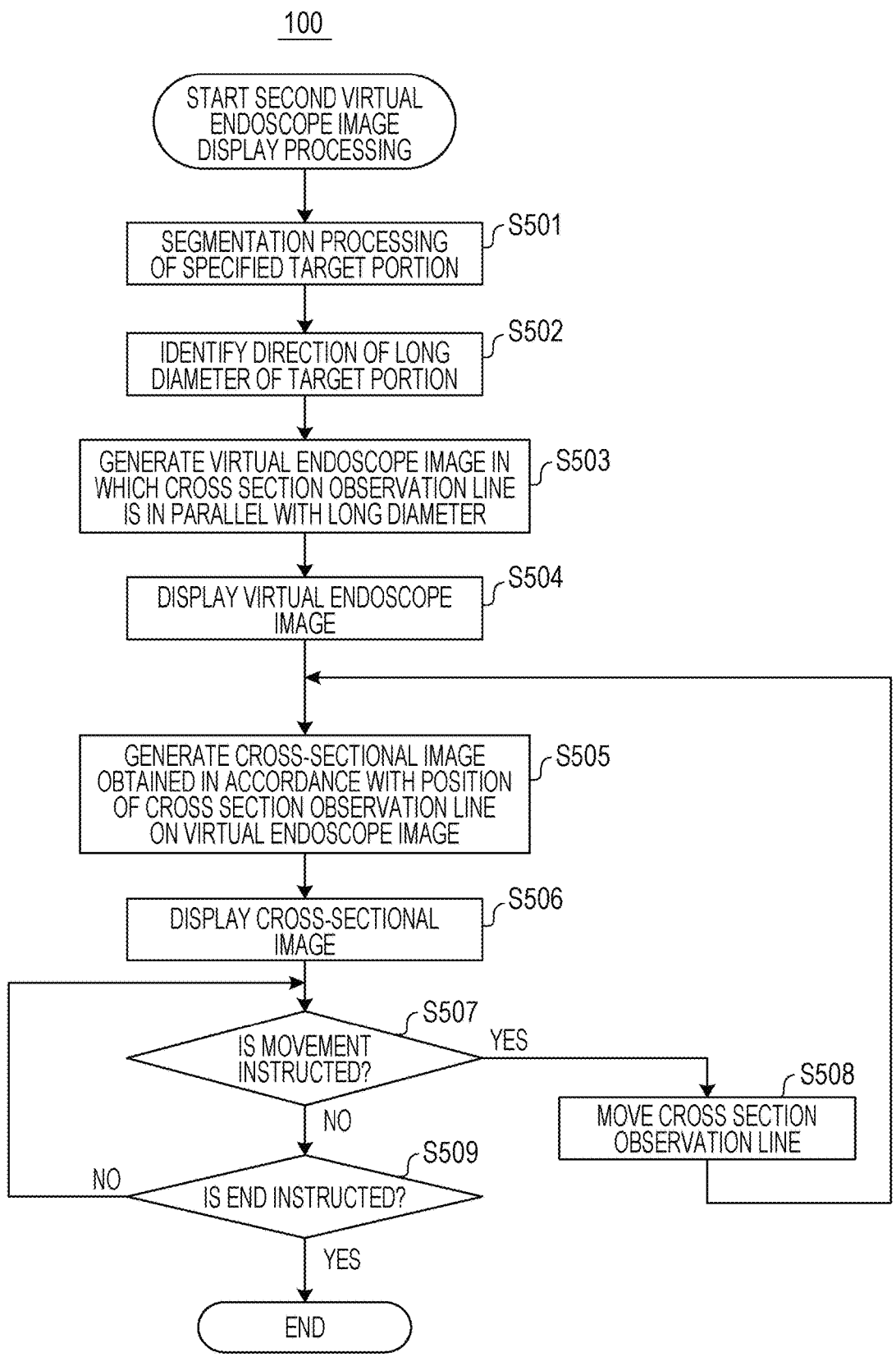
FIG. 5 is a flow chart for describing an example of detailed processing of second virtual endoscope image display processing illustrated in FIG. 3.

With that, the descriptions of the detailed processing of the at least one embodiment of the second virtual endoscope image display processing illustrated in FIG. 5 are ended.

According to the disclosed technology, it is possible to provide the system in which the cross-sectional state of the target portion where the specification is accepted can be easily checked.

Exemplary embodiments as a system, an apparatus, a method, a program, and a storage medium, for example, can also be realized in the present disclosure. Specifically, the exemplary embodiment may be applied to a system constituted by a plurality of devices or may also be applied to an apparatus constituted by a single device. It should be noted that the present disclosure includes a configuration in which a program of software that realizes the functions of the above-described exemplary embodiments is directly or remotely supplied to a system or an apparatus. In addition, the present disclosure includes a case where the functions are achieved while an information processing apparatus of the system or the apparatus reads out and executes the supplied program code.

Therefore, to realize function processing of the present disclosure by at least one embodiment of the information processing apparatus, a program code itself may be installed into the information processing apparatus also to realize the present disclosure. That is, the present disclosure includes a computer program itself for realizing the function processing of the present disclosure.

In the above-described case, a mode such as an object code, a program executed by an interpreter, or script data supplied to an operating system (OS) may be used as long as a function of the program is provided.

A recording medium that supplies the program includes, for example, a flexible disc, a hard disc, an optical disc, an opto-magnetic disc, an MO, a CD-ROM, a CD-R, a CD-RW, and the like. In addition, the recording medium includes a magnetic tape, a non-volatile memory card, a ROM, a DVD (DVD-ROM, DVD-R) and the like.

In addition, as a method of supplying the program, a connection is made to a homepage on the internet by using a browser of a client computer. Subsequently, the computer program itself of the present disclosure or a compressed file including an automatic install function is downloaded onto a recording medium such as a hard disc drive from the homepage, so that the program can be supplied.

The function processing can also be realized in a manner that the program code constituting the program of the present disclosure is divided into a plurality of files, and the respective files are downloaded from different homepages. That is, a world wide web (WWW) server that allows a plurality of users to download the program files for realizing the function processing of the present disclosure by the information processing apparatus is also included in the present disclosure.

Moreover, the program of the present disclosure is encrypted to be stored in a storage medium such as a CD-ROM and distributed to a user. A user who satisfies a predetermined condition is allowed to download key information for decrypting the encryption from a homepage via the internet. Subsequently, the function processing can be realized while the encrypted program is executed by using the downloaded key information to be installed into the information processing apparatus.

While the information processing apparatus executes the read program, the functions of the above-described exemplary embodiments are also realized. In addition, the OS or the like running on the information processing apparatus performs part or all of the actual processing on the basis of an instruction of the program, and the functions of the above-described exemplary embodiments may be realized by this processing.

Furthermore, the program read out from the recording medium is written to a memory included in a function expanding board inserted into the information processing apparatus or a function expanding unit connected to the information processing apparatus. Thereafter, a CPU or the like included in the function expanding board or the function expanding unit performs part or all of the actual processing on the basis of the instruction, and the functions of the above-described exemplary embodiments are also realized by this processing.

It should be noted that the above-described exemplary embodiments illustrate merely specific examples for implementing the present disclosure, and the technical scope of the present disclosure is not to be restrictively interpreted by the above-described exemplary embodiments. That is, the present disclosure can be implemented in various forms without departing from the technical concept or the main feature.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-253812 filed Dec. 25, 2015, which is hereby incorporated by reference herein in its entirety.

What is claimed is:

1. A medical image processing apparatus comprising:
one or more processors that operate to:
obtain a medical image including a tubular structure picked up by a medical image pickup apparatus;
generate a virtual endoscope image of the tubular structure on a basis of the obtained medical image;
accept a specification of a target portion on the tubular structure, the specification being performed on the virtual endoscope image;
determine a cross section observation line that indicates a cross section of the accepted target portion and that is displayed on the virtual endoscope image on a basis of a size of the target portion; and
perform control to generate a cross-sectional image of the target portion on the determined cross section observation line from the medical image and display the cross-sectional image.

2. The medical image processing apparatus according to claim 1, wherein the one or more processors further operate to:
accept an operation of moving the cross section observation line in a direction intersecting with an extending direction of the cross section observation line,
wherein the one or more processors perform the control to display the cross-sectional image corresponding to the cross section observation line in conjunction with the operation.

3. The medical image processing apparatus according to claim 1, wherein the cross section observation line is a line in parallel with a long diameter or a short diameter of the target portion.

4. The medical image processing apparatus according to claim 2, wherein the cross section observation line is a line in parallel with a long diameter or a short diameter of the target portion.

5. The medical image processing apparatus according to claim 2, wherein the one or more processors perform the control in a manner that a first cross-sectional image generated while corresponding to the cross section observation line in conjunction with the operation is set to be in parallel with a second cross-sectional image displayed before the operation is accepted.

6. The medical image processing apparatus according to claim 1, wherein the one or more processors further operate to:
obtain a viewpoint position of the generated virtual endoscope image,
wherein the one or more processors perform the control to generate the cross-sectional image of the target portion from the medical image on a basis of the determined cross section observation line and the obtained viewpoint position and display the cross-sectional image.

7. The medical image processing apparatus according to claim 2, wherein the one or more processors further operate to:
obtain a viewpoint position of the generated virtual endoscope image,
wherein the one or more processors perform the control to generate the cross-sectional image of the target portion from the medical image on a basis of the determined cross section observation line and the obtained viewpoint position and display the cross-sectional image.

8. The medical image processing apparatus according to claim 3, wherein the one or more processors further operate to:
obtain a viewpoint position of the generated virtual endoscope image,
wherein the one or more processors perform the control to generate the cross-sectional image of the target portion from the medical image on a basis of the determined cross section observation line and the obtained viewpoint position and display the cross-sectional image.

9. The medical image processing apparatus according to claim 4, wherein the one or more processors further operate to:
obtain a viewpoint position of the generated virtual endoscope image,
wherein the one or more processors perform the control to generate the cross-sectional image of the target portion from the medical image on a basis of the determined cross section observation line and the obtained viewpoint position and display the cross-sectional image.

10. The medical image processing apparatus according to claim 5, wherein the one or more processors further operate to:
obtain a viewpoint position of the generated virtual endoscope image,
wherein the one or more processors perform the control to generate the cross-sectional image of the target portion from the medical image on a basis of the determined cross section observation line and the obtained viewpoint position and display the cross-sectional image.

11. The medical image processing apparatus according to claim 1, wherein the one or more processors determine the cross section observation line at a position equivalent to a long diameter of the target portion.

12. The medical image processing apparatus according to claim 2, wherein the one or more processors determine the cross section observation line at a position equivalent to a long diameter of the target portion.

13. The medical image processing apparatus according to claim 3, wherein the one or more processors determine the cross section observation line at a position equivalent to the long diameter of the target portion.

14. The medical image processing apparatus according to claim 4, wherein the one or more processors determine the cross section observation line at a position equivalent to the long diameter of the target portion.

15. The medical image processing apparatus according to claim 5, wherein the one or more processors determine the cross section observation line at a position equivalent to a long diameter of the target portion.

16. The medical image processing apparatus according to claim 6, wherein the one or more processors determine the cross section observation line at a position equivalent to a long diameter of the target portion.

17. The medical image processing apparatus according to claim 7, wherein the one or more processors determine the cross section observation line at a position equivalent to a long diameter of the target portion.

18. A medical image processing apparatus comprising:
one or more processors that operate to:
obtain a medical image including a tubular structure picked up by a medical image pickup apparatus;
generate a virtual endoscope image of the tubular structure on a basis of the obtained medical image;
accept a specification of a target portion on the tubular structure, the specification being performed on the virtual endoscope image;
determine a long diameter of the accepted target portion;
generate a cross-sectional image along the determined long diameter of the target portion from the medical image; and
display the generated cross-sectional image on a display.

19. A medical image processing apparatus comprising:
one or more processors that operate to:
obtain a medical image including a tubular structure picked up by a medical image pickup apparatus;
generate a virtual endoscope image of the tubular structure on a basis of the obtained medical image;
accept a specification of a target portion on the tubular structure, the specification being performed on the virtual endoscope image;
determine a long diameter of the accepted target portion; and
superimpose information indicating a position of the determined long diameter of the target portion on the virtual endoscope image to be displayed on a display.

20. A medical image processing apparatus comprising:
one or more processors that operate to:
accept a specification of a target portion in a medical image;
determine a long diameter of the accepted target portion;
generate a cross-sectional image along the determined long diameter of the target portion from the medical image; and
display the generated cross-sectional image on a display.

* * * * *